(12) United States Patent
Ozawa

(10) Patent No.: US 10,618,017 B2
(45) Date of Patent: Apr. 14, 2020

(54) METHOD OF MIXING RUBBER COMPOSITION AND SYSTEM FOR MIXING RUBBER COMPOSITION

(71) Applicant: The Yokohama Rubber Co., LTD., Minato-ku, Tokyo (JP)

(72) Inventor: Osamu Ozawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 479 days.

(21) Appl. No.: 15/501,809

(22) PCT Filed: Jul. 21, 2015

(86) PCT No.: PCT/JP2015/070646
§ 371 (c)(1),
(2) Date: Feb. 3, 2017

(87) PCT Pub. No.: WO2016/021398
PCT Pub. Date: Feb. 11, 2016

(65) Prior Publication Data
US 2017/0225132 A1 Aug. 10, 2017

(30) Foreign Application Priority Data

Aug. 5, 2014 (JP) .................. 2014-159811
Mar. 18, 2015 (JP) .................. 2015-054542

(51) Int. Cl.
*B01F 3/12* (2006.01)
*B29B 7/18* (2006.01)
*B29B 7/28* (2006.01)
*B29B 7/74* (2006.01)
*B01F 3/14* (2006.01)
*B01F 3/20* (2006.01)
*B01F 15/00* (2006.01)
*B01F 15/06* (2006.01)
*C08L 9/02* (2006.01)

(52) U.S. Cl.
CPC .............. *B01F 3/1214* (2013.01); *B01F 3/14* (2013.01); *B01F 3/2071* (2013.01); *B01F 15/00175* (2013.01); *B01F 15/00201* (2013.01); *B01F 15/00253* (2013.01); *B01F 15/00292* (2013.01); *B01F 15/065* (2013.01); *B29B 7/183* (2013.01); *B29B 7/283* (2013.01); *B29B 7/286* (2013.01); *B29B 7/7495* (2013.01); *C08L 9/02* (2013.01); *B01F 2003/125* (2013.01); *B01F 2015/061* (2013.01); *B29B 7/186* (2013.01); *C08L 2201/56* (2013.01)

(58) Field of Classification Search
CPC ........ B01F 3/1214; B01F 3/14; B01F 3/2071; B01F 15/00175; B01F 15/00201; B01F 15/00253; B01F 15/00292; B01F 15/065; B29B 7/183; B29B 7/283; B29B 7/286; B29B 7/7495; C08L 9/02
USPC ........................................ 523/319, 322, 323
See application file for complete search history.

(56) References Cited

U.S. PATENT DOCUMENTS

2014/0249250 A1* 9/2014 Miyasaka ............... B29B 7/183
523/351

FOREIGN PATENT DOCUMENTS

| JP | S61-120025 | 6/1986 |
| JP | 2011-102038 | 5/2011 |
| JP | 2011-110748 | 6/2011 |
| WO | WO 2013/099331 | 7/2013 |

OTHER PUBLICATIONS

Machine translation JP 2011-102038 (Year: 2011).*
Machine translation JPS 61-121025 (Year: 1996).*
Machine translation JP 2011-110748 (Year: 2011).*
International Search Report for International Application No. PCT/JP2015/070646 dated Oct. 13, 2015, 4 pages, Japan.

* cited by examiner

*Primary Examiner* — Edward J Cain
(74) *Attorney, Agent, or Firm* — Thorpe North & Western

(57) ABSTRACT

A method of mixing a rubber composition includes a carbon introduction step and a uniform dispersion step. In the carbon introduction step, on the basis of a deviation between a rate of temperature increase of the rubber mixture (R) and a target value, at least one of a ram pressure (Pr) and a rotational speed (N) of the mixing rotor (2) is PID controlled so that the ultimate temperature of the rubber mixture (R) at the conclusion of the step is within a tolerance range. In the uniform dispersion step, the ram pressure (Pr) or the rotational speed (N) of the mixing rotor (2) is adjusted to reduce a deviation between a value based on successively detected data associated with a predetermined control target and a target value.

15 Claims, 8 Drawing Sheets

METHOD OF MIXING RUBBER COMPOSITION AND SYSTEM FOR MIXING RUBBER COMPOSITION

TECHNICAL FIELD

The present technology relates to a method of mixing a rubber composition and a system for mixing a rubber composition, and particularly relates to a method of mixing a rubber composition and a system for mixing a rubber composition in which a sealed mixer is used and are capable of producing a rubber composition with stabilized rubber physical properties by reducing variation in the ultimate temperature of the rubber mixture at the conclusion of a carbon introducing step, in which carbon is introduced into a raw rubber.

BACKGROUND ART

In the production of a rubber composition in which a sealed mixer is used and a raw rubber and carbon are mixed, various methods of mixing exist with an object of ensuring the stability of the rubber physical properties (see for example Japanese Unexamined Patent Application Publication No. 2011-102038A). The method of mixing described in Japanese Unexamined Patent Application Publication No. 2011-102038A is directed at a carbon introduction step in which carbon is introduced into a raw rubber, and an uniform dispersion step in which the introduced carbon is uniformly dispersed in the raw rubber. In the carbon introduction step, the integrated amount of power needed to drive a mixing rotor in rotation is detected, and once the detected integrated amount reaches a preset target amount, the process moves to the next step. In the uniform dispersion step, once the integrated amount of power needed to drive the mixing rotor in rotation reaches a preset target amount, the process moves to the next step, and in addition, a target mixing time, which is when the integrated amount of power needed to drive the mixing rotor in rotation should reach a preset target value, is determined, and the rotational speed of the mixing rotor is adjusted to reduce the deviation between the target mixing time and the estimated mixing time of this step.

In the carbon introduction step described above, when the integrated amount of power needed to drive the mixing rotor in rotation reaches the preset target amount, the ultimate temperature of the mixed rubber mixture may not be constant, which causes variations. These variations mean that variations are present in the process up until this point, and because variations in temperature are present at each progressing stage of the mixing, the rubber physical properties of the rubber composition are affected. In addition, the process of mixing the rubber mixture containing a reinforcing agent (carbon) is irreversible, and what is performed in the introduction step and the uniform dispersion step is different in nature. Thus, a problem exists in which when the variation in ultimate temperature of the rubber mixture at the conclusion of the carbon introduction step is great, the variation in the rubber physical properties of the manufactured rubber composition becomes great. There is room for enhancement involving this matter.

SUMMARY

The present technology provides a method of mixing a rubber composition and a system for mixing a rubber composition in which a sealed mixer is used and are capable of producing a rubber composition with stabilized rubber physical properties by reducing variation in the ultimate temperature of the rubber mixture at the conclusion of a carbon introducing step, in which carbon is introduced into a raw rubber.

The present technology is directed at a method of mixing a rubber composition, comprising the steps of introducing carbon into a raw rubber via mixing of the raw rubber and the carbon by a sealed mixer via a plurality of steps of a carbon introduction step; and uniformly dispersing the carbon introduced into the raw rubber via a plurality of steps of a uniform dispersion step, wherein in one of the steps of the carbon introduction step, once an integrated amount of power needed to drive a mixing rotor of the sealed mixer in rotation reaches a target integrated amount of power preset for the one of the steps of the carbon introduction step, a next step of the carbon introduction step is initiated, and in one of the steps of the uniform dispersion step, once an integrated amount of power needed to drive the mixing rotor in rotation reaches a target integrated amount of power preset for the one of the steps of the uniform dispersion step, a next step of the uniform dispersion step is initiated, and in one of the steps of the uniform dispersion step, a ram pressure of the sealed mixer or a rotational speed of the mixing rotor is adjusted to reduce a deviation between a value based on data associated with a predetermined control target successively detected and a target value based on preset detected data, to produce a rubber composition containing the mixed raw rubber and the carbon; wherein in the carbon introduction step, a temperature of a rubber mixture containing the raw rubber and the carbon is successively detected and a rate of temperature increase is calculated, on a basis of a deviation between the calculated rate of temperature increase and a preset target rate of temperature increase, at least one of the ram pressure and the rotational speed of the mixing rotor is PID controlled so that an ultimate temperature of the rubber mixture at conclusion of the carbon introduction step is within a preset tolerance range.

A system for mixing a rubber composition of the present technology comprises a sealed mixer configured to mix raw rubber and carbon;

a control device configured to control mixing operations by the sealed mixer, wherein a carbon introduction step in which the carbon is introduced into the raw rubber and a uniform dispersion step in which the carbon introduced into the raw rubber is uniformly dispersed each include a plurality of steps, and control is performed in one of the steps of the carbon introduction step, so that once an integrated amount of power needed to drive a mixing rotor of the sealed mixer in rotation reaches a target integrated amount of power preset for the one of the steps of the carbon introduction step, a next step of the carbon introduction step is initiated, and control is performed in one of the steps of the uniform dispersion step, so that once an integrated amount of power needed to drive the mixing rotor in rotation reaches a target integrated amount of power preset for the one of the steps of the uniform dispersion step, a next step of the uniform dispersion step is initiated, and control is performed in one of the steps of the uniform dispersion step, so that a ram pressure of the sealed mixer or a rotational speed of the mixing rotor is adjusted to reduce a deviation between a value based on data associated with a predetermined control target successively detected and a target value based on preset detected data, to produce a rubber composition containing the mixed raw rubber and the carbon; and a temperature sensor configured to successively detect a temperature of a rubber mixture containing the raw rubber and the carbon in the carbon introduction step, wherein data detected by the temperature sensor is input into the control device and a rate of temperature increase of the rubber mixture is calculated, and on a basis of a deviation between a calculated rate of temperature increase and a preset target rate of temperature increase, at least one of the ram pressure and the rotational speed of the mixing rotor is PID controlled so that an ultimate temperature of the rubber mixture at conclusion of the carbon introduction step is within a preset tolerance range.

According to the present technology, the temperature of the rubber mixture containing the raw rubber and the carbon in the carbon introduction step is successively detected and a rate of temperature increase is calculated. On the basis of the deviation between the calculated rate of temperature increase (rate gradient) and the preset target rate of temperature increase, at least one of the ram pressure and the rotational speed of the mixing rotor is PID controlled so that the ultimate temperature of the rubber mixture at the conclusion of the carbon introduction step is within the preset tolerance range. In other words, according to the present technology, the integrated amount of power needed to drive the mixing rotor in rotation for each step can be managed and the variations in the ultimate temperature of the rubber mixture at the conclusion of the carbon introduction step can be reduced. As a result, the tolerance range can be observed with high accuracy. Additionally, in the uniform dispersion step, the integrated amount of power needed to drive the mixing rotor in rotation for each step can be managed and the ram pressure or the rotational speed of the mixing rotors can be adjusted to reduce the deviation between the value based on successively detected data of the predetermined control target and the target value based on preset detected data. Accordingly, in the carbon introduction step and uniform dispersion step, mixing of the rubber mixture is controlled so that the rubber physical properties of the produced rubber composition can be stabilized.

DETAILED DESCRIPTION

Figure 1:
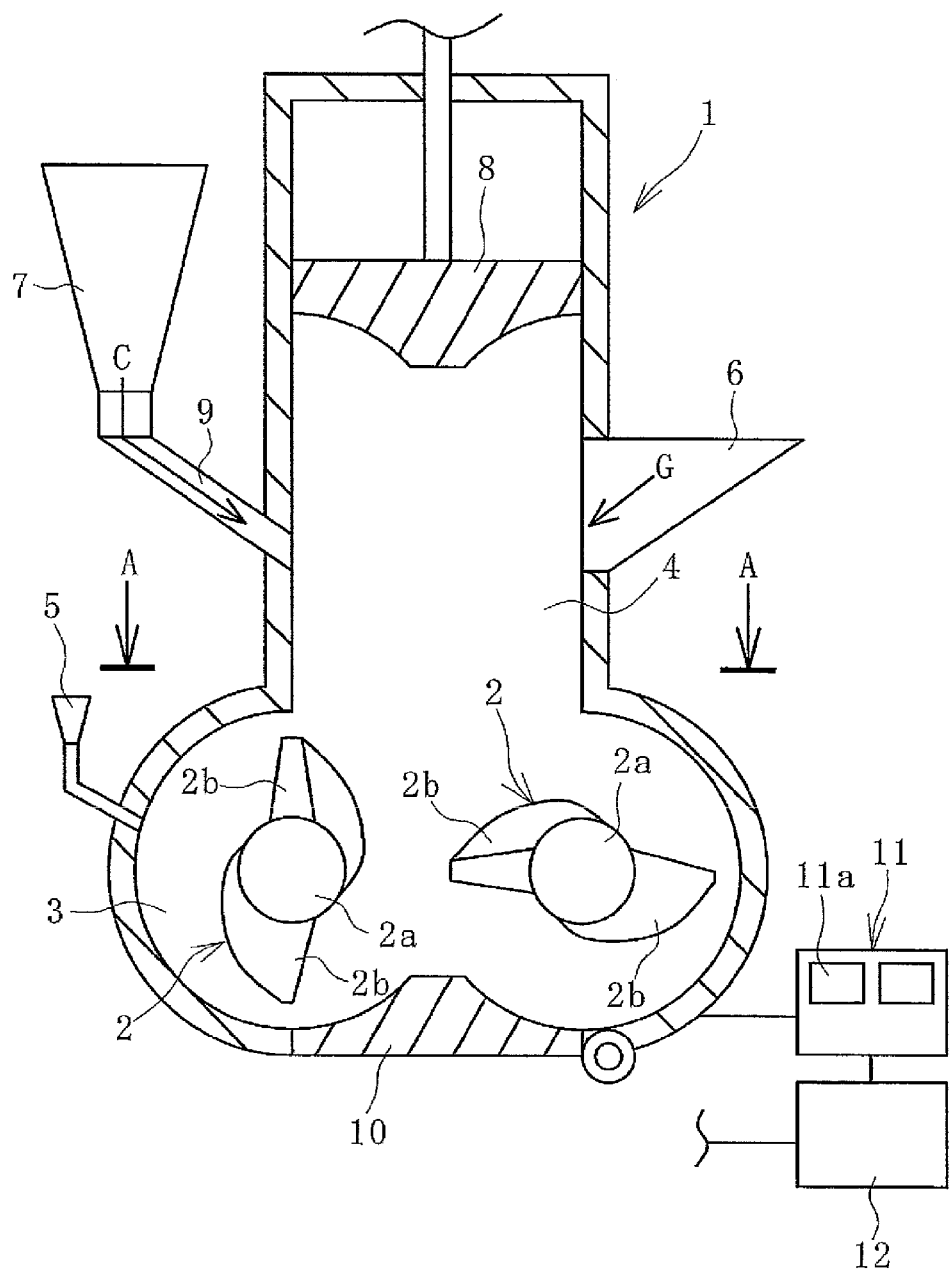
FIG. 1 is an explanatory view illustrating a system for mixing a rubber composition of the present technology.

Embodiments of a method of mixing a rubber composition and a system for mixing a rubber composition of the present technology illustrated in the drawings are described below.

Figure 2:
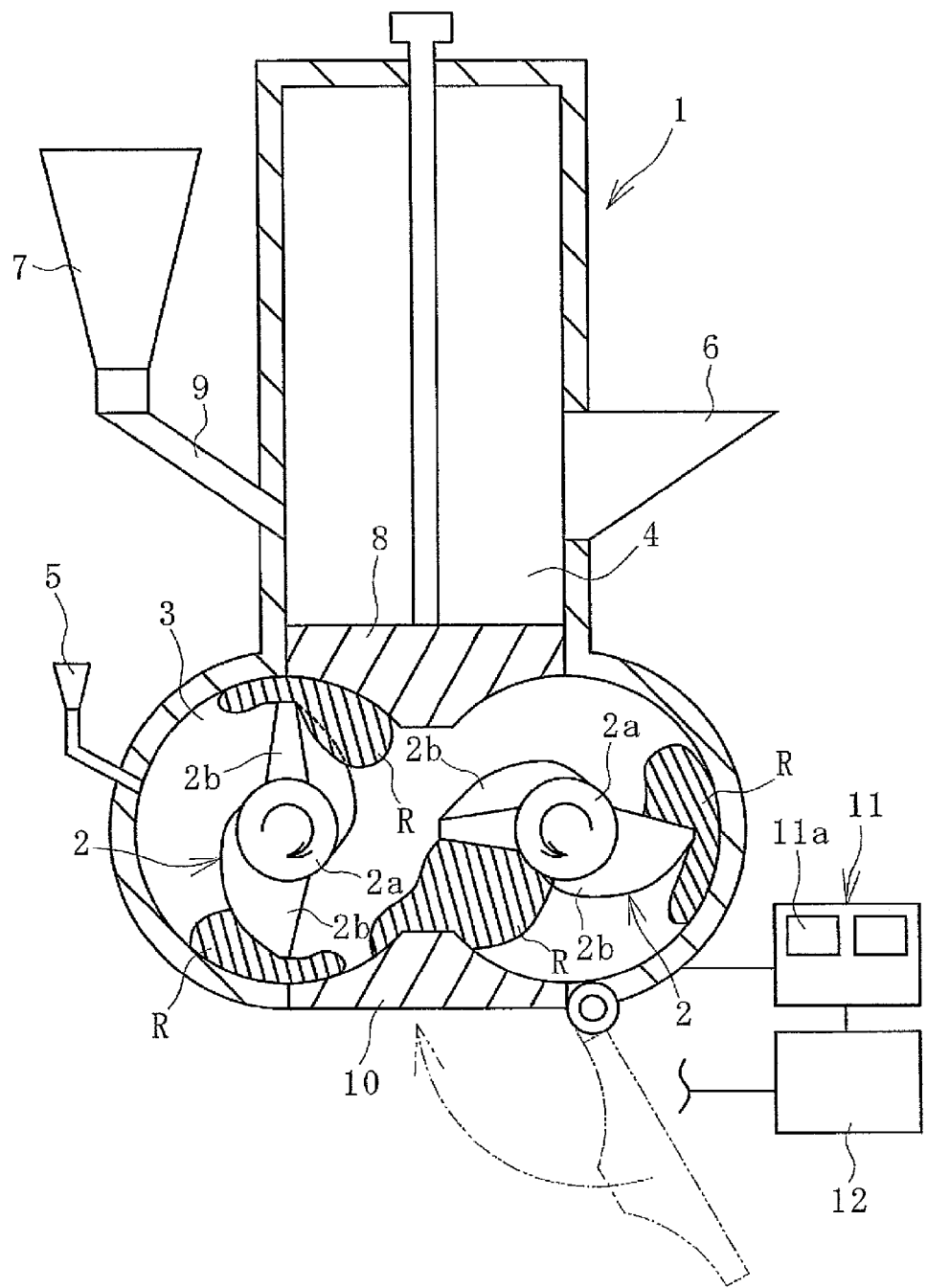
FIG. 2 is an explanatory view illustrating a rubber mixture in a state of being mixed by a sealed mixer of FIG. 1.
Figure 3:
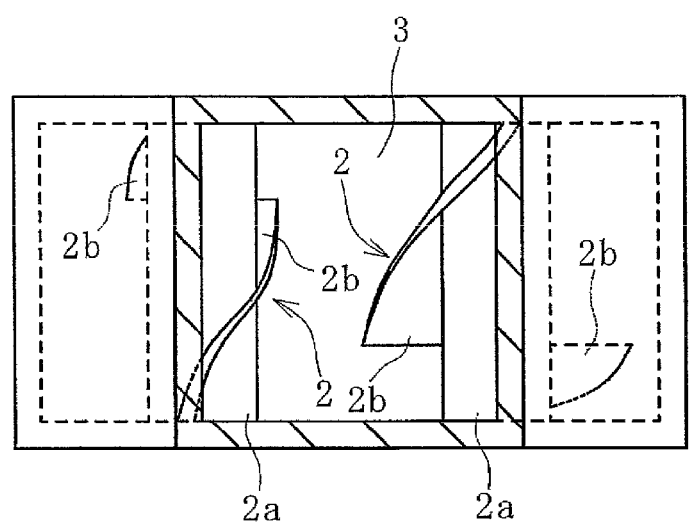
FIG. 3 is a cross-sectional view taken along A-A of FIG. 1.

A system for mixing a rubber composition (hereinafter, mixing system) of the present technology illustrated in FIGS. 1 to 3 includes a sealed mixer 1 with a mixing rotor such as a Banbury mixer, a sensor 11, and a control device 12 into which data detected by the sensor 11 is input. The control device 12 is configured to control the mixing operation of the sealed mixer 1. The mixing system of one embodiment is provided with a temperature sensor 11a.

The sealed mixer 1 is provided with a mixing chamber 3 and a ram chamber 4 joined to the upper portion of the mixing chamber 3. The mixing chamber 3 is provided with a pair of mixing rotors 2 disposed in an opposing manner and an oil feed portion 5. A blade 2b is disposed in a protruding manner on each mixing rotor 2. The mixing rotors 2 are driven in rotation by rotation shafts 2a disposed parallel to one another. On the bottom surface of the mixing chamber 3, an openable and closeable discharge door 10 is provided. In the mixing chamber 3, a rubber mixture R containing a raw rubber carbon C, and the like is mixed, and ultimately a rubber composition is produced.

In the ram chamber 4, a ram 8 is disposed. The ram is configured to move up and down to adjust the pressure (ram pressure Pr) inside the mixing chamber 3. Additionally, the ram chamber 4 is provided with a rubber feed portion 6 for feeding the raw rubber G and a carbon feed portion 9 for feeding the carbon C from a hopper 7.

The sensor 11 detects rotational speed N of the mixing rotors 2, current value I of the motor for driving the mixing rotors 2 in rotation, the amount of variation over time in current value I, the power needed for driving, integrated amount of power S which is an integrated value of the power, temperature T of the mixing chamber 3, temperature Tr of the rubber mixture R, and the ram pressure Pr. The control device 12 is configured to control the rotational speed N of the mixing rotors 2, the ram pressure Pr, and the like.

In the present technology, a rubber composition is produced by mixing the raw rubber the carbon C, and the like using the method described below. In other words, to produce a rubber composition, a rubber mastication step, a carbon introduction step, and a uniform dispersion step are performed in this order. Upon conclusion of the uniform dispersion step, the produced rubber composition is discharged outside of the sealed mixer 1 from the opened discharge door 10.

The rubber mastication step is a preparatory step for the carbon introduction step, which is a next step, in which factors which may cause changes in temperature, such as storage conditions of the raw rubber G and the operation history of the sealed mixer 1, are reset, and the raw rubber G and the sealed mixer 1 are adjusted to a predetermined temperature. This adjustment reduces variations in the properties and quality of the rubber composition across processed batches. In the carbon introduction step, in the initial stage, the carbon C is introduced quickly. In the later stage, to suppress heat generation from the rubber mixture R and thus enhance kneading, the rubber mixture R is mixed at low temperatures. As a result, bound rubber is formed, which allows the modulus to be improved. In the uniform dispersion step, the ram 8 is raised up in the ram chamber 4 and ram reversal is performed, flipping the rubber mixture R over via the rotation of the mixing rotors 2. Thereafter, to suppress the generation of heat and improve the kneading of the rubber mixture R, rising temperatures and the power value of the mixing rotors 2 are controlled to be constant, allowing the viscosity to be stabilized. Additionally, in the second half of the uniform dispersion step, the temperature T of the mixing chamber 3 and the torque Tq of the mixing rotors 2 are controlled to be a constant value.

Typically, when reinforcing agents such as carbon C are added to the raw rubber G and mixed, a rubber mixture R is obtained in which the reinforcing agents are sufficiently introduced into the raw rubber G and the raw rubber the reinforcing agents, and the like form attachments. In this embodiment, the surface activity of the reinforcing agents causes the raw rubber G and the reinforcing agent to form attachments chemically and physically and form into an aggregate which swells in a solvent but does not completely dissolve. This aggregate is known as "bound rubber" or "carbon gel".

Additionally in the present technology, during the mixing steps, the rotational speed N of the mixing rotors 2 and the ram pressure Pr can be varied, thus allowing for temperature control of each mixing step (mixing process) to suppress the generation of heat. Also, a decision to conclude each step based on the integrated amount of power S is provided, and when a predetermined target integrated amount of power is reached, the next step is initiated. In particular, when mixing a rubber composition based on nitrile-butadiene rubber (NBR), control is performed on the basis of the integrated amount of power S at the initial stages of mixing in the carbon introduction step (initial stages of mixing with a temperature of 70° C. or lower and a bound rubber forming region with a temperature of from 70 to 120° C.), allowing the modulus to be improved and stabilized. Additionally, in the uniform dispersion step, power mixing is performed, and once the predetermined integrated amount of power is reached, the produced rubber composition is discharged, allowing the viscosity to be stabilized. Even more preferably, in particular when external temperatures varying with the seasons such as summer and winter have a significant effect, time, temperature, amount of power, and amount of power associated with the steps and power (current) are monitored, and the ram pressure Pr and degree of kneading, the rotational speed N and the mixing time, and the like are controlled via feedback to make the method of mixing more effective.

The mixing process will be described in more detail below using an example of producing a NBR rubber composition highly filled with carbon. The mixing process is made up of the rubber mastication step, the carbon introduction step, and the uniform dispersion step. Each of these steps are made up of a first half step and a second half step.

In the rubber mastication step, the ram 8 is raised up to a standby position, and the raw rubber G is fed in through the rubber feed portion 6. Thereafter, the ram 8 is lowered, and while feeding oil from the oil feed portion 5, the mixing rotors 2 are driven in rotation to mix the raw rubber G and the oil.

In this first half of the rubber mastication step, i.e. step 1, the rotational speed N of the mixing rotors 2 may be fixed (for example, at 20 rpm) and the ram pressure Pr may be fixed (for example, at 0.5 MPa). In the second half, step 2, the ram pressure Pr is kept at the same value as that of step 1 and the rotational speed N of the mixing rotors 2 is reduced (for example, to 15 rpm).

The power E, which represents the load of the mixing rotors 2, becomes greater in the initial stage of step 1, but decreases and remains at a low value thereafter. In addition, the temperature T of the mixing chamber 3 is decreased by cooling. Step 1 is concluded and step 2 is initiated when the temperature T of the mixing chamber 3 matches a preset predetermined first temperature T1 or when a fixed length of time elapses. Control is performed to conclude step 2 when the temperature T of the mixing chamber 3 matches a preset predetermined second temperature T2 or when a fixed length of time elapses.

Once the rubber mastication step is concluded, the next carbon introduction step is initiated. In the carbon introduction step, the carbon C is supplied into the mixing chamber 3 from the hopper 7 via the carbon feed portion 9. Then the raw rubber G and the carbon C are mixed.

In a first half of the carbon introduction step, i.e. step 3, the carbon C placed on top of the raw rubber G mixed in the rubber mastication step is broadly mixed to gradually form small pieces of rubber with the carbon C covering their surface.

In the second half, step 4, the carbon C on the surface is mixed in with the raw rubber G, and gradually the small pieces of rubber become larger, and ultimately form one piece of rubber. In this process, attachments are formed between the raw rubber G and the carbon C (bound rubber) and the torque Tq acting on the mixing rotors 2 increases.

Figure 4:
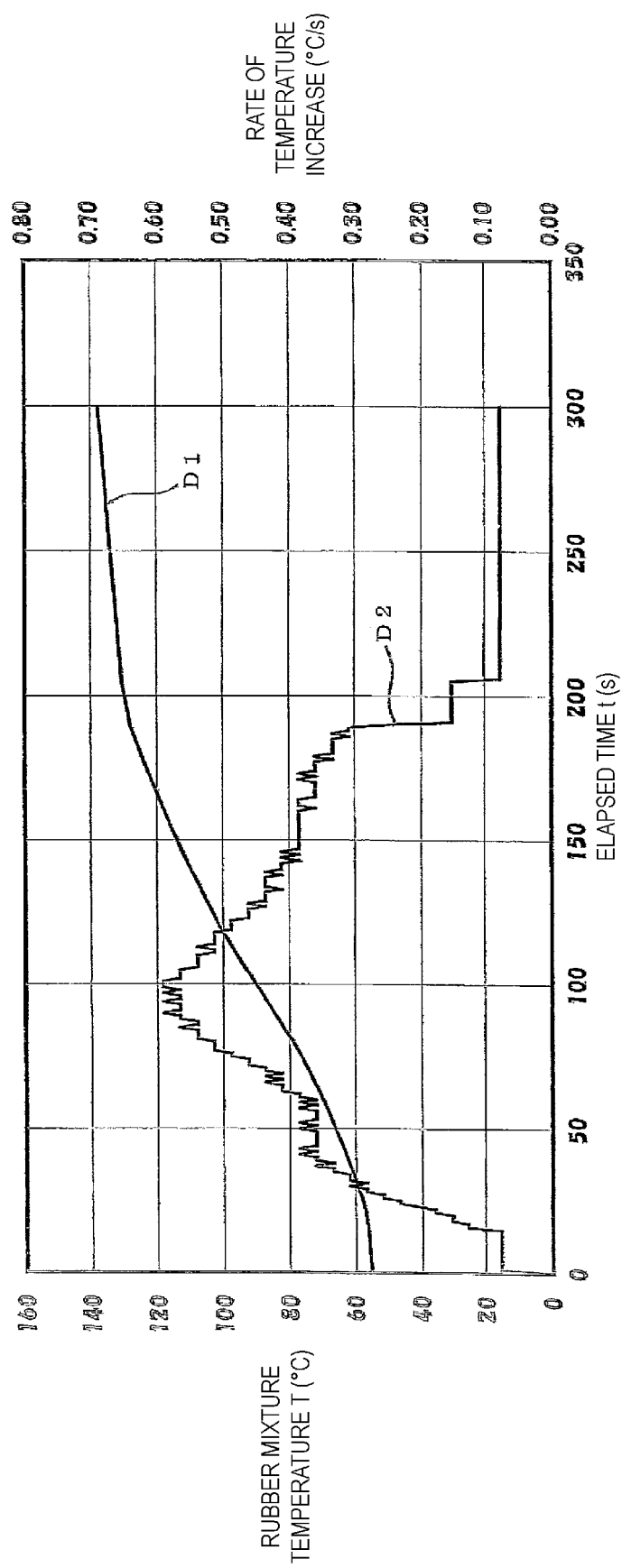
FIG. 4 is a graph showing changes over time of the temperature of the rubber mixture and the rate of temperature increase (temperature gradient).

In step 3 and step 4, the temperature T of the rubber mixture R containing the raw rubber G and the carbon C is successively detected by the temperature sensor 11$a$ to produce data D1 such as that illustrated in FIG. 4. The data detected by the temperature sensor 11$a$ is input into the control device 12, and on the basis of this detection data, the control device 12 calculates the rate of temperature increase (rate gradient) of the rubber mixture R as data D2 such as that illustrated in FIG. 4.

The rate of temperature increase (rate gradient) is preferably found using averaged data (average temperature gradient $\Delta Tm$) obtained from a moving average over a predetermined averaging period of time of detection data detected by the temperature sensor 11$a$, which is sampled in predetermined periods. The predetermined period for the sampling may be set to various periods, but is preferably from 10 to 100 Hz, for example. Additionally, the predetermined averaging period of time used to find the moving average can be set to various lengths of time, but is preferably within a time range of from 0.1 to 10 seconds.

On the basis of the deviation $e_i$ between the calculated rate of temperature increase (average temperature gradient $\Delta Tm$) and a preset target rate of temperature increase ($\Delta T^*$), the control device 12 performs proportional integral derivative control (PID control) on at least one of the ram pressure Pr and the rotational speed N of the mixing rotors 2. PID control is a feedback control system in which an input value is controlled on the basis of three parameters: deviation between an output value and a target value, and the integral and differential thereof. Using this PID control, the ultimate temperature of the rubber mixture R at the conclusion of the carbon introduction step is controlled within a preset tolerance range.

The PID control operates in the range:

$$\Delta T^* - \Delta Tw \sim \Delta T^* + \Delta Tw$$

where $\Delta Tw$ is the proportional band. Outside of this range, the output via PID control is set at 100% of the upper and lower limit. The deviation $e_i$ is the difference between the average temperature gradient $\Delta Tm$ and the target rate of temperature increase ΔT* divided by the proportional band ΔTw, and is calculated as shown in Equation (1) below.

$$e_i = (\Delta Tm - \Delta T^*)/\Delta Tw \quad (1)$$

The difference $\Delta e_i$ from the immediately prior deviation is calculated, and the difference $\Delta e_i$ for the last 2 periods ($\Delta e_{i-1}$, $\Delta e_{i-2}$) are stored in the control device 12. PID outputs are calculated as shown in Equations (2) to (4) below, where Kp is the proportional gain, Ki is the integral gain, and Kd is the derivative gain.

$$\Delta MV_{P,i} = Kp \times \Delta e_i \quad (2)$$

$$\Delta MV_{I,i} = Ki \times e_i \quad (3)$$

$$\Delta MV_{d,i} = Kd \times (\Delta e_i + \Delta e_{i-1}) \quad (4)$$

The manipulated variable of the PID control is calculated as shown in Equation (5) below, and the output via PID control is calculated as shown in Equation (6) below.

$$\Delta MV_i = \Delta MV_{P,i} + \Delta MV_{I,i} + \Delta MV_{D,i} \quad (5)$$

$$MV_i = MV_{i-1} + \Delta MV_i \quad (6)$$

When the ram pressure Pr is controlled via this PID control, the pressure P1 after control is calculated as shown in Equation (7) below.

$$P1 = P0 + PW \times MV \quad (7)$$

where P0 is the current value of the ram pressure Pr, and PW is the adjusted width at 100%.

When the rotational speed N of the mixing rotors 2 is controlled via this PID control, the rotational speed N1 after control is calculated as shown in Equation (8) below.

$$N1 = N0 + NW \times MV \quad (8)$$

where N0 is the current value of the rotational speed N, and NW is the adjusted width at 100%.

Figure 5:
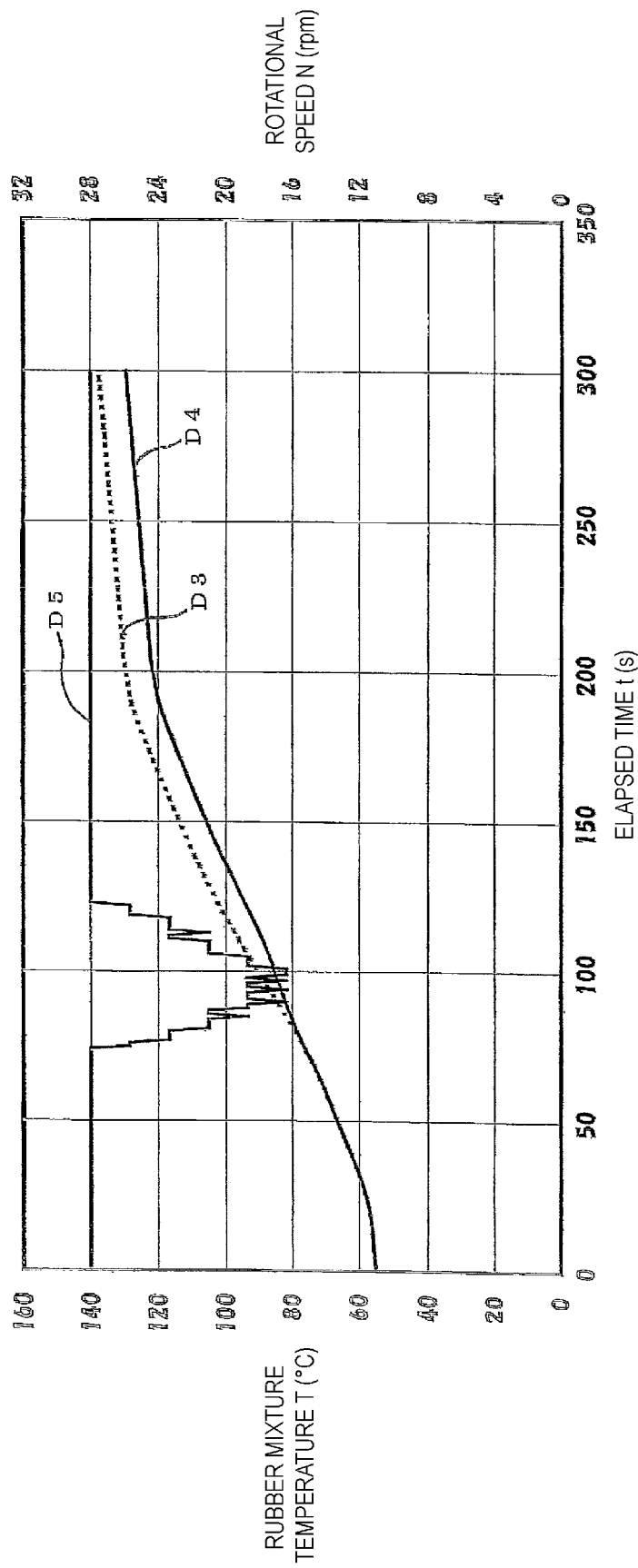
FIG. 5 is graph showing the differences in the changes over time in the temperature of the rubber mixture due to control of the rotational speed of a mixing rotor.

The effects when controlling the rotational speed N of the mixing rotors 2 via PID control are shown in FIG. 5. Data D3 of FIG. 5 represents the change over time in temperature of the rubber mixture R when the rotational speed N is not controlled. Here, the rotational speed N, as represented by data D5 in FIG. 5, is PID controlled on the basis of the deviation between the rate of temperature increase (temperature gradient) calculated from the temperatures of the rubber mixture R successively detected by the temperature sensor 11a and the preset target rate of temperature increase. This makes the temperature change over time of the rubber mixture R change from data D3 to data D4 as shown. As a result, the ultimate temperature of the rubber mixture R at the conclusion of the carbon introduction step stays within the preset tolerance range.

Step 3 of the carbon introduction step concludes once the integrated amount of power S matches a predetermined first target integrated amount of power S1 preset for step 3, and step 4 is initiated. Additionally, control is performed so that step 4 concludes once the integrated amount of power S matches a predetermined second target integrated amount of power S2 preset for step 4.

In such a carbon introduction step, the integrated amount of power S needed to drive the mixing rotors 2 in rotation for each step is managed, and in addition, the ram pressure Pr and/or the rotational speed N of the mixing rotors 2 are PID controlled so that the ultimate temperature of the rubber mixture R at the conclusion of the carbon introduction step is within a preset tolerance range. This reduces the variations in the ultimate temperature of the rubber mixture R at the conclusion of the carbon introduction step, and thus the tolerance range is observed with high accuracy.

The target rate of temperature increase (ΔT*), for example, is set on the basis of the heat balance of the sealed mixer 1 in the carbon introduction step. Typically, the heat balance preferably takes into account parameters Q1 to Q3 below. First, Q1 is the heat generated by the rubber mixture R when the rubber mixture R containing the raw rubber G and the carbon C are mixed by the mixing rotors 2 in the carbon introduction step. In other words, the shear force induced on the rubber mixture R by the mixing rotors 2 causes the rubber mixture R to generate heat, hence heat generated Q1 is taken into account.

In the sealed mixer 1, cooling fluid flows in the sealed mixer 1 to cool the sealed mixer 1, drawing away the heat from the sealed mixer 1. Here, heat absorbed Q2 by the cooling fluid in the carbon introduction step is taken into account.

In the carbon introduction step, heat dissipates (thermal conduction) from the rubber mixture R to other portions, hence heat dissipated Q3 is taken into account. Heat dissipated Q3 can be broken down into the rise in temperature $Q3_M$ of the sealed mixer 1 due to thermal conduction to the sealed mixer 1, heat dissipated $Q3_L$ from the sealed mixer 1 to the outside environment via heat transfer, and heat dissipated $Q3_D$ due to replacement of the air inside the sealed mixer 1. In other words, $Q3 = Q3_M + Q3_L + Q3_D$. The rise in temperature of the rubber mixture R in the carbon introduction step corresponds to a surplus of generated heat Q of the heat balance, where surplus of generated heat $Q = Q1 - Q2 - Q3$.

Additionally, a model equation for calculating the target rate of temperature increase (ΔT*) is set, and based on performance data, the undefined model equation coefficient is determined using the nonlinear least squares method (direct search method) and the like. Once the model equation coefficient is determined, the target rate of temperature increase (ΔT*) can be set on the basis of performance data of the heat balance.

The model equation as function of time (t) is set as shown in (9) below, for example.

$$\Delta T^*(t) = a \cdot \exp\{-b(t-c)^2\} + d \cdot \exp\{-e(t-f)^2\}g \quad (9)$$

$$dQ(t)/dt = c_c \cdot m_c \Delta T^*(t)$$

$$Q = c_c \cdot m_c \int \Delta T^*(t)$$

The integration interval is $0 \leq t \leq \tau$ ($\tau$ is the mixing time in the carbon introduction step). Here, $c_c$ is the specific heat of the rubber mixture R, and $m_c$ is the heat capacity of the rubber mixture R.

Note that when an undefined coefficient determined through application of various performance data is substituted into the model equation (9), the temperature profile of the rubber mixture R calculated on the basis of the model equation can be confirmed as conforming well with the performance data.

Upon the carbon introduction step concluding, the uniform dispersion step is initiated. In the first half of the uniform dispersion step, i.e. step 5, the rotational speed N of the mixing rotors 2 is decreased and kept constant (at 15 rpm, for example) and the ram pressure Pr is kept at the same value as that of step 4 and kept constant. In this process, the carbon C is uniformly dispersed throughout all of the raw rubber R G. Because the rubber mixture R at this stage becomes extremely viscous, resulting in power consumption increasing and much of the applied energy being converted to heat, heat generation increases. Thus, in the initial period, mixing is begun with the rotational speed N and the ram pressure Pr set low and then gradually increased.

In the second half, step 6, the rotational speed N of the mixing rotors 2 is further decreased (to 10 rpm, for example). Thereafter, the rotational speed is gradually brought up back to the original speed (15 rpm, for example). Additionally, the ram pressure Pr is kept at the same value as that of step 5 and kept constant. Note that the power E representing the load of the mixing rotors 2 becomes gradually greater in step 5, and is approximately the same value in step 6. In this process, the viscosity of the rubber mixture R well kneaded in the final stages of mixing is adjusted. Furthermore, though the rotational speed N is reduced to suppress heat generation, the rotational speed N can be gradually increased within a range in which temperature increases of the rubber mixture R can be suppressed. Additionally, temperature increases can be suppressed by lowering the ram pressure Pr as necessary (in cases where the temperature increases).

Step 5 concludes once the integrated amount of power S matches a predetermined third target integrated amount of power S3 preset for step 5, and step 6 is initiated. Control is also performed so that step 6 concludes once the integrated amount of power S matches a predetermined fourth target integrated amount of power S4 preset for step 6.

In step 6, by controlling and adjusting the ram pressure Pr to reduce the deviation between the measured value of the temperature T of the mixing chamber 3 and a target temperature T3, which is a target value preset for step 6, the rubber composition physical properties and quality can be made more uniform.

Additionally, in step 6, the ram pressure Pr is controlled and adjusted to reduce the deviation between the measured value of the amount of variation over time in current value I of the motor needed to drive the mixing rotors 2 in rotation and a target amount of variation over time, which is a target value preset for step 6. This also allows the rubber composition physical properties and quality to be made more uniform. Note that control may be performed using both the temperature T of the mixing chamber 3 and the measured value of the amount of variation over time in current value I.

In step 6, the ram pressure Pr is controlled and adjusted to reduce the deviation between the temperature T of the mixing chamber 3 and/or the measured value of the amount of variation over time in current value I of the motor needed to drive the mixing rotors 2 in rotation and a target value preset for this step. This configuration enables the rubber composition physical properties, quality, and in particular viscosity to be made uniform.

In the technology described above, in the carbon introduction step and the uniform dispersion step, the integrated amount of power S needed to drive the mixing rotors 2 in rotation for each step is managed before processing to the next step. Additionally, in the carbon introduction step, at least one of the ram pressure Pr and the rotational speed N of the mixing rotors 2 is PID controlled so that the ultimate temperature of the rubber mixture R at the conclusion of the carbon introduction step is within a preset tolerance range. In the uniform dispersion step, the ram pressure Pr or the rotational speed N of the mixing rotors 2 is adjusted to reduce the deviation between a value based on successively detected data of a predetermined control target and a target value based on preset detected data. By such a mixing process, in the important carbon introduction step and uniform dispersion step, mixing of the rubber mixture R is controlled so that the rubber physical properties of the produced rubber composition can be stabilized.

In the sealed mixer 1, the rubber mixture R is mixed and kneaded via the shear force applied to it by being wedged between the blades 2b of the rotating mixing rotors 2 and the inner surface of the mixing chamber 3. Accordingly, the detected data for power, temperature, and the like may vary depending upon the manner in which the blades 2b of the rotating mixing rotors 2 approach the inner surface of the mixing chamber 3, how the rubber mixture R is wedged, and the like. Thus, in the detected time series data, variations in the periodic manner in which the blades 2b of the rotating mixing rotors 2 approach the inner surface of the mixing chamber 3 and incidental variations can be considered to be included.

Figure 6:
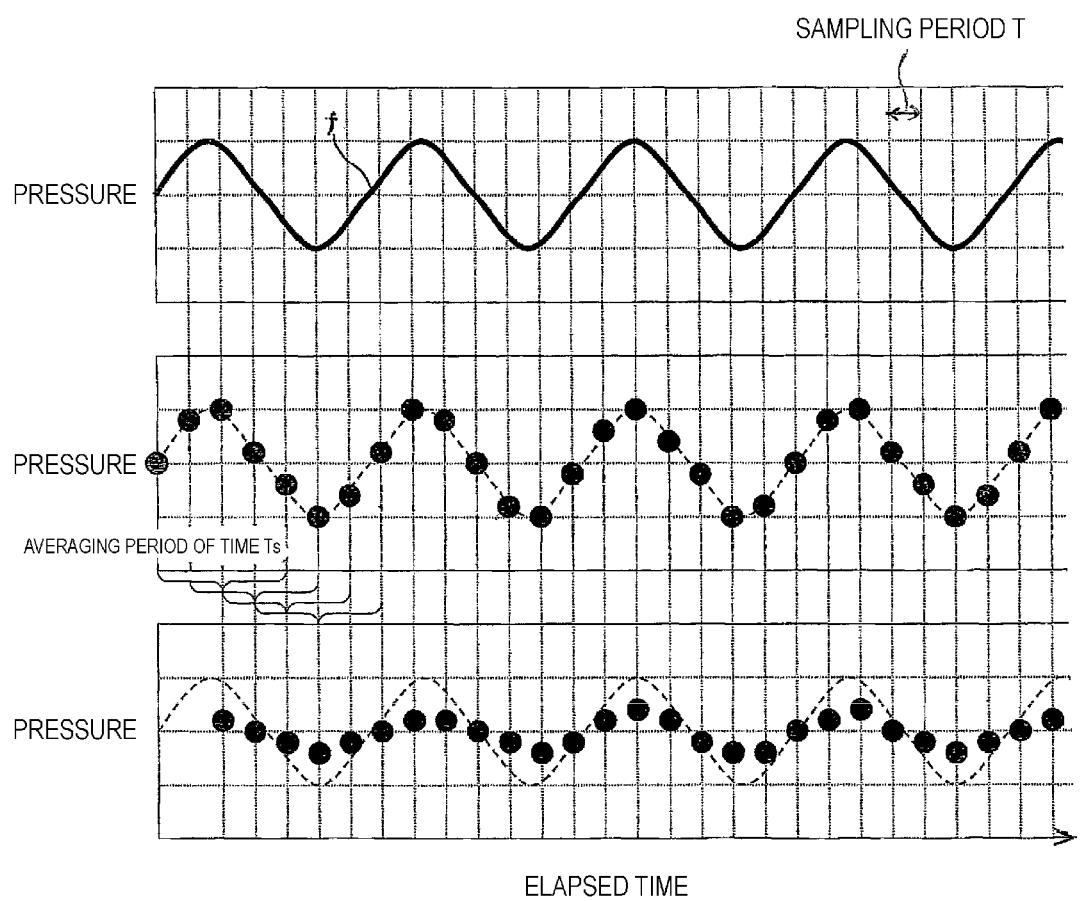
FIG. 6 shows graphs of moving average data calculated by sampling time series data in predetermined periods.

Time series data f, with periodic variation, is represented in the top graph of FIG. 6 by a solid line. This time series data f is sampled in predetermined periods T (sampling period T) and is used when finding the moving average over a predetermined averaging period of time Ts. Note that in the middle and lower graphs of FIG. 6, the time series data f is drawn in a dashed line.

The data value at each time of sampling are represented in the middle graph of FIG. 6 by ○. The data values calculated by finding the simple moving average of the sampled data ○ over the predetermined averaging period of time Ts are represented in the bottom graph of FIG. 6 by ○. In the averaged data represented by ○ in the bottom graph of FIG. 6, the periodic variations of the time series data f are still present.

Upon averaging the data in such a manner, unless the sampling period T and averaging period of time Ts of the sampled data are suitably set, suitable averaged data cannot be obtained. Thus, upon averaging, it is desirable to set these suitably and remove the periodic variations of the time series data.

To remove such periodic variations, sampling may be performed in the sampling period T which is smaller than the periodic variations of the time series data, and the time (hereinafter, rotor phase Tp) needed for the blades 2b of the mixing rotors 2 to return to the same mutual circumferential positional relationship with their surroundings may be averaged over the averaging period of time Ts.

Here, the sampling period T may be set on the basis of the rotational speed N (rpm) of one or both of the two mixing rotors 2. For example, the sampling period T (ms) can be set by Expression (1) below, where the rotational speed N (rpm) of the two mixing rotors 2 is $N_1$ and $N_2$ respectively ($N_1 \geq N_2$).

$$T \leq (5/3) \cdot N_2 \qquad (1)$$

Figure 7:
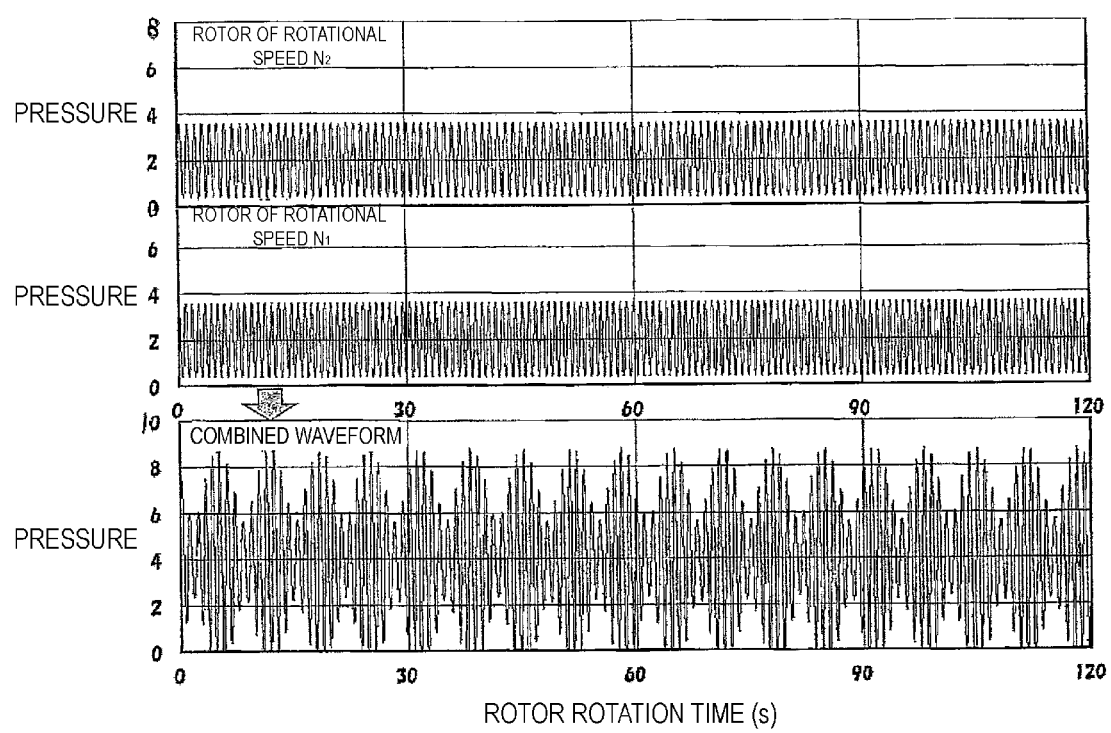
FIG. 7 shows graphs of time series data of simulations of pressure waveforms associated with the mixing rotors of the sealed mixer.

FIG. 7 shows graphs of a simulation of time series data of a pressure waveform (sine wave) associated with the two mixing rotors 2, where the two mixing rotors 2, each provided with two blades 2b, have the rotational speed of $N_1=69$ (rpm) and $N_2=60$ (rpm), the rotational speed ratio is 1.15, and the sealed mixer 1 is a tangential (non-meshing) mixer. The top graph of FIG. 7 shows the pressure waveform associated with the mixing rotor 2 with the rotational speed $N_2$ and the middle graph of FIG. 7 shows the pressure waveform associated with the mixing rotor 2 with the rotational speed $N_1$. In the sealed mixer 1, the two mixing rotors 2 rotate. Thus the pressure waveforms of the top and the middle graphs can be combined to form the pressure waveform of the bottom graph of FIG. 7.

Figure 8:
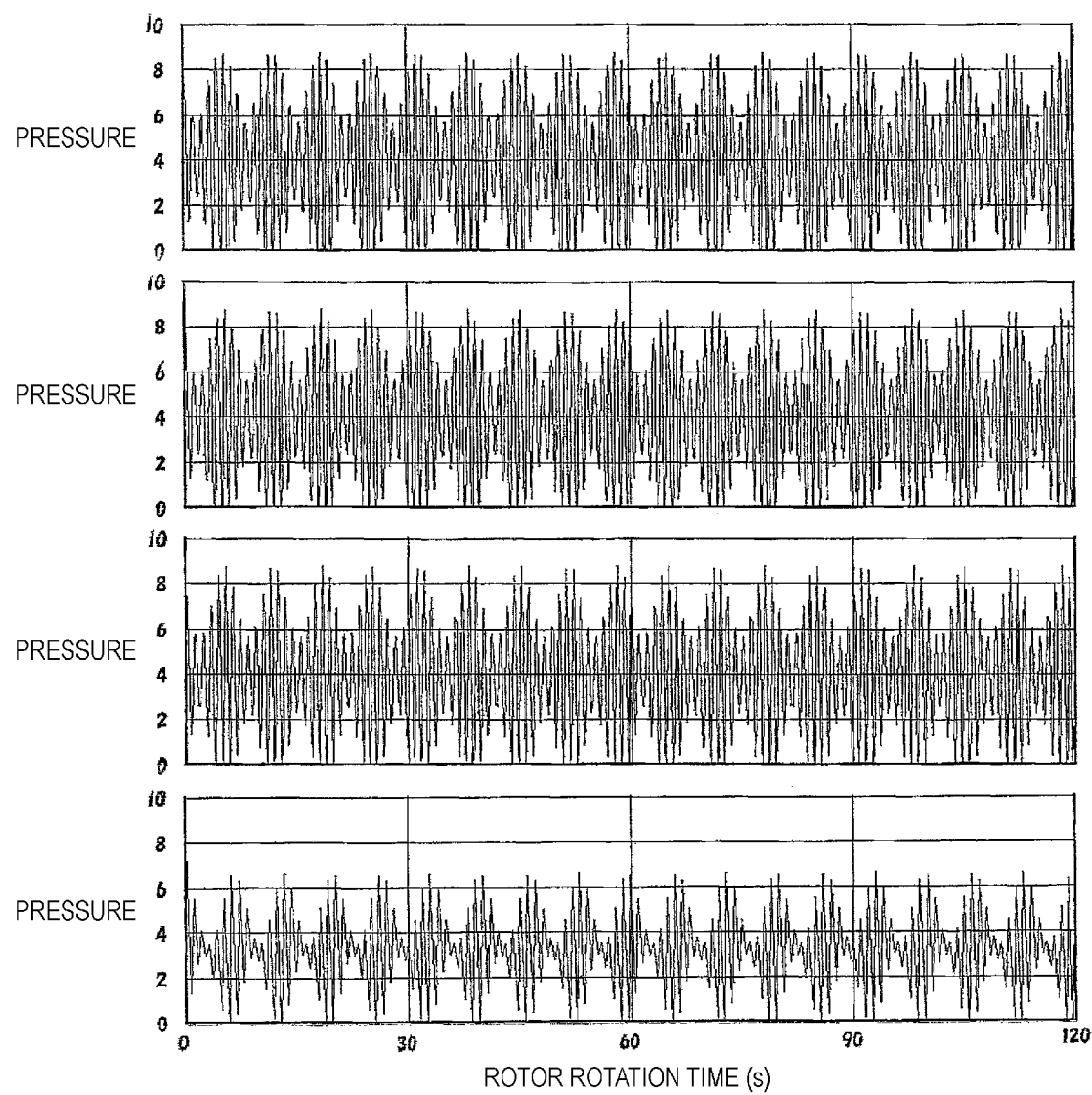
FIG. 8 shows graphs of pressure waveforms in cases in which the time series data of FIG. 7 is sampled and a moving average is found.

FIG. 8 shows pressure waveforms in cases in which the moving average of the time series data of the pressure waveform shown in the bottom graph of FIG. 7 is found over a predetermined equal averaging period of time with the sampling period being varied. In FIG. 8, in order from the top, the first graph shows the pressure waveform when the sampling period is 10 (ms), the second graph when 100 (ms), the third graph when 200 (ms), and the fourth graph when 500 (ms).

By comparing the calculated data shown in FIG. 8 and the time series data shown in the bottom graph of FIG. 7, it can be seen that in the cases in which the sampling period T is 10 (ms) and 100 (ms), the waveform is a highly accurate reproduction of the time series data shown in FIG. 7. However, when the sampling period T is 200 (ms) and 500 (ms), the time series data shown in FIG. 7 is not reproduced as accurately.

From this result, it is clear that when the rotational speed $N_2=60$ (rpm), a sampling period T of 100 (ms) or less is suitable. Additionally, when the rotational speed $N_2=30$ (rpm), a sampling period T of 50 (ms) or less can be assumed to be suitable. Expression (1) can be derived on this basis.

The averaging period of time Ts upon sampling may be set on the basis of the form of the two mixing rotors 2, the rotational speed N (rpm), and the rotational speed ratio. The form of the mixing rotors 2 is typically the number of blades 2b disposed on the mixing rotors 2.

Depending on the specifications of the sealed mixer 1, the two mixing rotors 2 may have the same or different rotational speeds N (rpm). In cases in which the rotational speeds N of the mixing rotors 2 are the same, in other words, the rotational speed ratio is 1, when the rotation amount of the mixing rotors 2 needed for the blades 2b of the mixing rotors 2 to return to the same mutual circumferential positional relationship with their surroundings is taken as s (rotation), the averaging period of time Ts can be set by Expression (2) below.

$$Ts = s \cdot (60/N) \quad (2)$$

In cases in which the rotational speeds N of the two mixing rotors 2 are different speeds $N_1$ and $N_2$ ($N_1 \neq N_2$), when the rotational speed ratio $N_2/N_1$ of the relatively great rotational speed over the relatively low rotational speed is taken as v, the rotation amount of the mixing rotors 2 needed for the blades 2b of the mixing rotors 2 to return to the same mutual circumferential positional relationship with their surroundings, and the rotational speed N (rpm) of the mixing rotors 2 is the same is taken as s (rotation), the averaging period of time $T_s$ can be set by Expression (3) below. Note that the value of v is approximately from 1.05 to 1.50, for example.

$$Ts = s \cdot (1/(v-1)) \cdot (60/N_2) \quad (3)$$

Describing the rotor phase Tp and the rotation amount s in detail, when each mixing rotor 2 (blade 2b) rotates once, it returns to the same circumferential position. The period T in cases in which the rotational speed N of the two are the same is the time taken for one rotation of the mixing rotors 2. In other words, $T(s)=60/N$ (rpm).

Here, taking into account the symmetry of the circumferential position of the blades 2b about the rotation shafts 2a, when the mixing rotors 2 each include one blade 2b, s=1; when two blades 2b are disposed evenly in the circumferential direction, the blades 2b return to the same mutual circumferential position with their surroundings after half a rotation of the mixing rotors 2, thus s=½; when three blades 2b are disposed evenly in the circumferential direction, s=⅓; and when four blades 2b are disposed evenly in the circumferential direction, s=¼. Accordingly, the rotor phase Tp, i.e. the averaging period of time Ts, is $s \cdot (60/N)$.

In cases in which the rotational speeds N of the mixing rotors 2 are different speeds $N_1$ and $N_2$ ($N_1 \neq N_2$), the smaller the rotational speed ratio v is, the greater the rotation amount of the mixing rotors 2 needed for the blades 2b to return to the same mutual circumferential positional relationship with their surroundings is, becoming $s \cdot (1/(v-1))$. Accordingly, as described above, the rotor phase Tp, i.e. the averaging period of time Ts, is $s \cdot (1/(v-1)) \cdot (60/N_2)$.

By setting the predetermined period T and the averaging period of time Ts in such a manner, the periodic variations of the time series data can be removed. Thus, suitably averaged data can be obtained.

The invention claimed is:

1. A method of mixing a rubber composition, comprising the steps of:
   introducing carbon into a raw rubber by mixing the raw rubber and the carbon with a sealed mixer via a plurality of steps of a carbon introduction step; and
   uniformly dispersing the introduced carbon throughout the raw rubber via a plurality of steps of a uniform dispersion step, wherein
   in one of the steps of the carbon introduction step, once an integrated amount of power needed to drive a mixing rotor of the sealed mixer in rotation reaches a target integrated amount of power preset for the one of the steps of the carbon introduction step, a next step of the carbon introduction step is initiated, and
   in one of the steps of the uniform dispersion step, once an integrated amount of power needed to drive the mixing rotor in rotation reaches a target integrated amount of power preset for the one of the steps of the uniform dispersion step, a next step of the uniform dispersion step is initiated, and in one of the steps of the uniform dispersion step, a ram pressure of the sealed mixer or a rotational speed of the mixing rotor is adjusted to reduce a deviation between a value based on successively detected data associated with a predetermined control target and a target value based on preset detected data, to produce a rubber composition containing the mixed raw rubber and the carbon; wherein
   in the carbon introduction step, a temperature of a rubber mixture containing the raw rubber and the carbon is successively detected and a rate of temperature increase is calculated, and
   on a basis of a deviation between the calculated rate of temperature increase and a preset target rate of temperature increase, at least one of the ram pressure and the rotational speed of the mixing rotor is PID controlled so that an ultimate temperature of the rubber mixture at a conclusion of the carbon introduction step is within a preset tolerance range.

2. The method of mixing a rubber composition according to claim 1, wherein as data for the calculated rate of temperature increase, averaged data obtained from a moving average over a predetermined averaging period of time of data sampled in predetermined periods is used.

3. The method of mixing a rubber composition according to claim 2, wherein the mixing rotor includes two mixing rotors disposed in an opposing manner, and the predetermined period for sampling is set on a basis of a rotational speed N (rpm) of at least one of the mixing rotors.

4. The method of mixing a rubber composition according to claim 3, wherein the predetermined period T is set by Expression (1) below, where $N_1$ and $N_2$ are the rotational speeds N (rpm) of the two mixing rotors ($N_1 \geq N_2$), and T (ms) is the predetermined period;

$$T \leq (5/3) \cdot N2 \quad (1).$$

5. The method of mixing a rubber composition according to claim 3, wherein the averaging period of time for sampling is set on a basis of form, the rotational speed N (rpm), and rotational speed ratio of the two mixing rotors.

6. The method of mixing a rubber composition according to claim 5, wherein the rotational speeds N (rpm) of the two mixing rotors are equal, and the averaging period of time Ts is set by Expression (2) below, where s (rotation) is a rotation amount of the mixing rotors needed for blades of the mixing rotors to return to a same mutual circumferential positional relationship with their surroundings;

$$Ts = s \cdot (60/N) \quad (2).$$

7. The method of mixing a rubber composition according to claim 5, wherein the rotational speed N of the two mixing rotors are different speeds $N_1$ and $N_2$ ($N_1 \neq N_2$), and the averaging period of time Ts is set by Expression (3), where v is a rotational speed ratio $N_2/N_1$ of a relatively great rotational speed over a relatively low rotational speed, Ts (s) is the averaging period of time, and s (rotation) is a rotation amount of the mixing rotors needed for blades of the mixing rotors to return to a same mutual circumferential positional relationship with their surroundings when the rotational speed N (rpm) of the mixing rotors is equal;

$$Ts = s \cdot (1/(v-1)) \cdot (60/N_2) \quad (3).$$

8. The method of mixing a rubber composition according to claim 2, wherein a predetermined period for sampling is from 10 to 100 Hz.

9. The method of mixing a rubber composition according to claim 2, wherein the averaging period of time is from 0.1 to 10 seconds.

10. The method of mixing a rubber composition according to claim 1, wherein the predetermined control target is an amount of variation over time of a temperature of a mixing chamber of the mixer or a current value needed to drive the mixing rotor in rotation, and the ram pressure or the rotational speed of the mixing rotor is adjusted to reduce a deviation between a measurement value of the control target and a target value.

11. The method of mixing a rubber composition according to claim 1, wherein the target rate of temperature increase is set on a basis of a heat balance of the sealed mixer in the carbon introduction step.

12. The method of mixing a rubber composition according to claim 11, wherein heat generated from the rubber mixture containing the raw rubber and the carbon upon the rubber mixture being mixed by the mixing rotor, heat absorbed by a cooling fluid for cooling the sealed mixer, and heat dissipated from the rubber mixture are taken into account for the heat balance.

13. A system for mixing a rubber composition, the system comprising:
    a sealed mixer configured to mix raw rubber and carbon;
    a control device configured to control mixing operations of the sealed mixer, wherein
    a carbon introduction step, in which the carbon is introduced into the raw rubber, and a uniform dispersion step, in which the introduced carbon is uniformly dispersed throughout the raw rubber, each include a plurality of steps, and
    control is performed in one of the steps of the carbon introduction step, so that once an integrated amount of power needed to drive a mixing rotor of the sealed mixer in rotation reaches a target integrated amount of power preset for the one of the steps of the carbon introduction step, a next step of the carbon introduction step is initiated, and
    control is performed in one of the steps of the uniform dispersion step, so that once an integrated amount of power needed to drive the mixing rotor in rotation reaches a target integrated amount of power preset for the one of the steps of the uniform dispersion step, a next step of the uniform dispersion step is initiated, and
    control is performed in one of the steps of the uniform dispersion step, so that a ram pressure of the sealed mixer or a rotational speed of the mixing rotor is adjusted to reduce a deviation between a value based on successively detected data associated with a predetermined control target and a target value based on preset detected data, to produce a rubber composition containing the mixed raw rubber and the carbon; and
    a temperature sensor configured to successively detect a temperature of a rubber mixture containing the raw rubber and the carbon in the carbon introduction step, wherein data detected by the temperature sensor is input into the control device and a rate of temperature increase of the rubber mixture is calculated, and
    on a basis of a deviation between a calculated rate of temperature increase and a preset target rate of temperature increase, at least one of the ram pressure and the rotational speed of the mixing rotor is PID controlled so that an ultimate temperature of the rubber mixture at conclusion of the carbon introduction step is within a preset tolerance range.

14. The system for mixing a rubber composition according to claim 13, wherein the target rate of temperature increase is set on a basis of a heat balance of the sealed mixer in the carbon introduction step.

15. The system for mixing a rubber composition according to claim 14, wherein heat generated from the rubber mixture containing the raw rubber and the carbon upon the rubber mixture being mixed by the mixing rotor, heat absorbed by a cooling fluid for cooling the sealed mixer, and heat dissipated from the rubber mixture are taken into account for the heat balance.

* * * * *